United States Patent
Hamadate et al.

(10) Patent No.: US 12,092,241 B2
(45) Date of Patent: Sep. 17, 2024

(54) REFRIGERANT PIPE

(71) Applicants: DAIKIN INDUSTRIES, LTD., Osaka (JP); FUSO INDUSTRIES LTD., Sakai (JP)

(72) Inventors: Junichi Hamadate, Osaka (JP); Masanori Jindou, Osaka (JP); Hao Ye, Sakai (JP)

(73) Assignees: DAIKIN INDUSTRIES, LTD., Osaka (JP); FUSO INDUSTRIES LTD., Sakai (JP)

( * ) Notice: Subject to any disclaimer, the term of this patent is extended or adjusted under 35 U.S.C. 154(b) by 55 days.

(21) Appl. No.: 17/813,933

(22) Filed: Jul. 21, 2022

(65) Prior Publication Data

US 2022/0349501 A1    Nov. 3, 2022

Related U.S. Application Data

(63) Continuation of application No. PCT/JP2020/046451, filed on Dec. 14, 2020.

(30) Foreign Application Priority Data

Jan. 27, 2020    (JP) .................. 2020-010799

(51) Int. Cl.
*F16L 13/007* (2006.01)
*F16L 13/08* (2006.01)
*F25B 41/40* (2021.01)

(52) U.S. Cl.
CPC ............ *F16L 13/007* (2013.01); *F16L 13/08* (2013.01); *F25B 41/40* (2021.01)

(58) Field of Classification Search
CPC ............... F16L 13/0209; F16L 13/0218; F16L 13/0236; F16L 13/08; F16L 13/007; F16L 13/013; F16L 13/122; F25B 41/40
See application file for complete search history.

(56) References Cited

U.S. PATENT DOCUMENTS

| 4,415,187 | A | 11/1983 | Hudson, Jr. |
| 2014/0016995 | A1* | 1/2014 | Wilson .................. F16L 13/007 156/60 |
| 2016/0312923 | A1* | 10/2016 | Shi .......................... B23K 31/02 |

FOREIGN PATENT DOCUMENTS

| CN | 202934254 U | 5/2013 |
| CN | 203115316 U | 8/2013 |

(Continued)

OTHER PUBLICATIONS

International Preliminary Report on Patentability issued in corresponding International Application No. PCT/JP2020/046451 mailed Aug. 11, 2022 (6 pages).

(Continued)

*Primary Examiner* — Aaron M Dunwoody
(74) *Attorney, Agent, or Firm* — Osha Bergman Watanabe & Burton LLP (57) ABSTRACT

A refrigerant pipe constituting a refrigerant circuit of a refrigeration apparatus, includes: a pipe body made of stainless steel; and a first connecting tube made of copper or a copper alloy and that is configured to connect a first different refrigerant pipe to the refrigerant pipe. The first connecting tube is connected to an outer circumferential surface of a first end of the pipe body in a pipe axis direction of the pipe body. The first connecting tube overlaps with the pipe body in a pipe diameter direction in an entirety of the first connecting tube in the pipe axis direction.

6 Claims, 5 Drawing Sheets

(56) References Cited

FOREIGN PATENT DOCUMENTS

| | | |
|---|---|---|
| CN | 203115362 U | 8/2013 |
| CN | 104806824 A | 7/2015 |
| CN | 110605493 A | 12/2019 |
| JP | S52049952 A | 4/1977 |
| JP | 2003166677 A | 6/2003 |
| JP | 2012-000645 A | 1/2012 |
| JP | 2017-137961 A | 8/2017 |
| JP | 2020-153555 A | 9/2020 |

OTHER PUBLICATIONS

Extended European Search Report issued in corresponding European Patent Application No. 20916933.3, dated Jul. 12, 2023 (8 pages).
Written Opinion issued in corresponding International Application No. PCT/JP2020/046451 dated Feb. 2, 2021 (4 pages).
International Search Report issued in corresponding International Application No. PCT/JP2020/046451 mailed Feb. 2, 2021, with translation (5 pages).

* cited by examiner

FIG. 5

REFRIGERANT PIPE

TECHNICAL FIELD

The present disclosure relates to a refrigerant pipe.

BACKGROUND

Patent Literature 1 discloses a method of joining a refrigerant pipe with a stainless steel tube interposed between an aluminum tube and a copper tube in order to join these tubes. This joining method includes joining the stainless steel tube and the copper tube by furnace brazing.

PATENT LITERATURE

PATENT LITERATURE 1: Japanese Laid-Open Patent Publication No. 2012-645

SUMMARY

The present disclosure provides a refrigerant pipe constituting a refrigerant circuit of a refrigeration apparatus, the refrigerant pipe including:
a pipe body made of stainless steel; and
a connecting tube made of copper or a copper alloy and provided to connect a different refrigerant pipe; wherein
the connecting tube is connected to an outer circumferential surface of an end in a pipe axis direction of the pipe body, and
the connecting tube has an entirety in the pipe axis direction overlapped with the pipe body in a pipe diameter direction.

DETAILED DESCRIPTION

Embodiments of the present disclosure will be described in detail hereinafter with reference to the accompanying drawings.

First Embodiments

Entire Configuration of Refrigeration Apparatus

Figure 1:
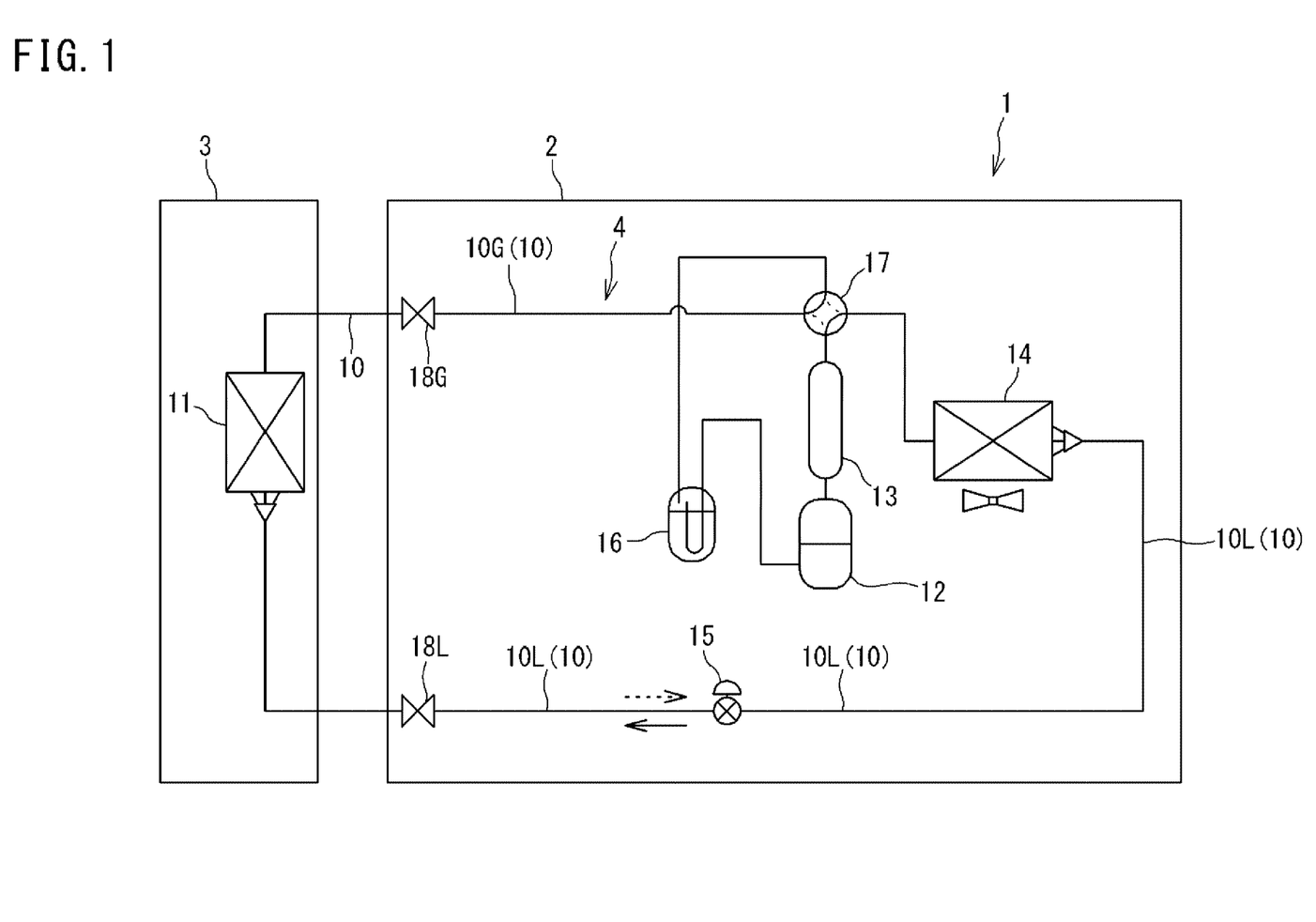
FIG. 1 is a schematic configuration diagram of a refrigeration apparatus including a refrigerant pipe according to first embodiments.

FIG. 1 is a schematic configuration diagram of a refrigeration apparatus including a refrigerant pipe according to the first embodiments.

A refrigeration apparatus 1 exemplifies an air conditioner configured to condition indoor temperature and indoor humidity, and includes an outdoor unit 2 disposed outdoors and an indoor unit 3 disposed indoors. The outdoor unit 2 and the indoor unit 3 are connected to each other with use of a refrigerant pipe 10.

The refrigeration apparatus 1 includes a refrigerant circuit 4 configured to achieve a vapor compression refrigeration cycle. The refrigerant circuit 4 includes a plurality of element components and the refrigerant pipe 10 connecting the plurality of element components. The refrigerant circuit 4 includes, as the element components, an indoor heat exchanger 11, a compressor 12, a muffler 13, an outdoor heat exchanger 14, an expansion mechanism 15, an accumulator 16, a four-way switching valve 17, shutoff valves 18L and 18G, and the like, which are connected with use of the refrigerant pipe 10. The refrigerant pipe 10 includes a liquid pipe 10L and a gas pipe 10G. The liquid pipe 10L and the gas pipe 10G are provided with the shutoff valves 18L and 18G, respectively.

The indoor heat exchanger 11 is provided in the indoor unit 3 and executes heat exchange between a refrigerant and indoor air. Examples of the indoor heat exchanger 11 include a fin-and-tube heat exchanger of a cross-fin type and a heat exchanger of a microchannel type. The indoor heat exchanger 11 is provided therearound with an indoor fan (not depicted) configured to send indoor air to the indoor heat exchanger 11 and send conditioned air to indoors.

The compressor 12, the muffler 13, the outdoor heat exchanger 14, the expansion mechanism 15, the accumulator 16, the four-way switching valve 17, and the shutoff valves 18L and 18G are provided in the outdoor unit 2. The compressor 12 is configured to compress the refrigerant sucked from a suction tube and discharge the compressed refrigerant from a discharge tube. Examples of the compressor 12 include various compressors such as a scroll compressor.

The muffler 13 inhibits pressure pulsation of the refrigerant discharged from the compressor 12. The discharge tube of the compressor 12 and the four-way switching valve 17 may interpose an oil separator in place of or in addition to the muffler 13. The oil separator is configured to separate lubricant from fluid mixture that contains the lubricant and the refrigerant and is discharged from the compressor 12.

The outdoor heat exchanger 14 executes heat exchange between the refrigerant and outdoor air. Examples of the outdoor heat exchanger 14 include a fin-and-tube heat exchanger of a cross-fin type and a heat exchanger of a microchannel type. The outdoor heat exchanger 14 is provided therearound with an outdoor fan configured to send outdoor air to the outdoor heat exchanger 14.

The expansion mechanism 15 is disposed between the outdoor heat exchanger 14 and the indoor heat exchanger 11 on the refrigerant pipe 10 in the refrigerant circuit 4, and expands the incoming refrigerant to be decompressed to have predetermined pressure. Examples of the expansion mechanism 15 include an electronic expansion valve having a variable opening degree, and a capillary tube.

The accumulator 16 is disposed between a suction port of the compressor 12 and the four-way switching valve 17 in the refrigerant circuit 4, and is configured to separate the incoming refrigerant into a gas refrigerant and a liquid refrigerant. The gas refrigerant thus separated by the accumulator 16 is sucked into the compressor 12.

The four-way switching valve 17 is configured to be switchable between a first state indicated by a solid line in FIG. 1 and a second state indicated by a broken line. The four-way switching valve 17 is switched into the first state while the air conditioner 1 executes cooling operation, and the four-way switching valve 17 is switched into the second state while the air conditioner 1 executes heating operation.

Configuration of Refrigerant Pipe

Figure 2:
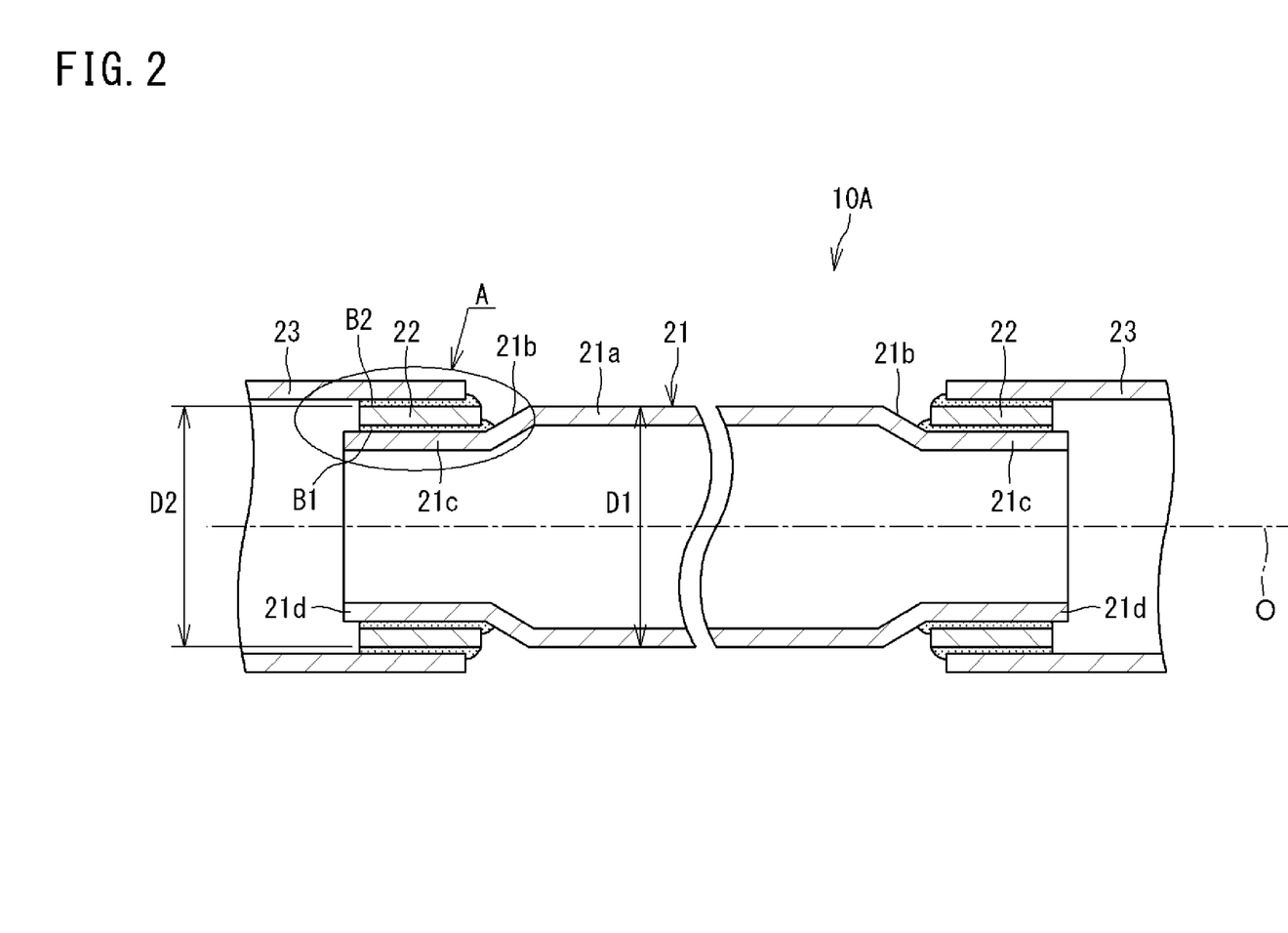
FIG. 2 is a sectional view of the refrigerant pipe.

FIG. 2 is a sectional view of a refrigerant pipe 10A.

At least one of the element components described above is connected with the refrigerant pipe 10A depicted in FIG. 2. The refrigerant pipe 10A includes a pipe body 21 and a connecting tube 22. The pipe body 21 and the connecting tube 22 have an identical axis O. Hereinafter, a direction of the axis O will be also called a "pipe axis direction". A radial direction around the axis O will be also called a "pipe diameter direction".

The refrigerant pipe 10A has an end connected with a different refrigerant pipe 23. The different refrigerant pipe 23 may protrude from an element component such as the compressor 12 to constitute part of the element component, or may be simply a refrigerant pipe disposed between element components. The different refrigerant pipe 23 according to the present embodiments is made of copper. The "copper" in the present specification is "pure copper" containing at least 99.9 weight percent of copper as a main ingredient.

The pipe body 21 and the connecting tube 22 are constituted by different members.

The pipe body 21 constitutes most of the refrigerant pipe 10A. The pipe body 21 is a stainless steel pipe made of SUS304, SUS304L, SUS436L, SUS430, or the like.

The pipe body 21 includes a major diameter portion 21a, a stepped portion 21b, and a minor diameter portion 21c, which are aligned in the pipe axis direction. FIG. 2 exemplarily depicts the minor diameter portion 21c disposed at each end of the pipe body 21. The stepped portion 21b is provided continuously to the minor diameter portion 21c. The stepped portion 21b is gradually increased in outer diameter outward in the pipe diameter direction from the minor diameter portion 21c. The stepped portion 21b is interposed between the minor diameter portion 21c and the major diameter portion 21a in the pipe axis direction. The major diameter portion 21a is provided continuously to the stepped portion 21b. The major diameter portion 21a is larger in outer diameter than the minor diameter portion 21c.

The pipe body 21 has an end in the pipe axis direction of a pipe having an outer diameter D1 and reduced in the pipe diameter direction to form the minor diameter portion 21c and the stepped portion 21b, and the major diameter portion 21a constitutes most of the pipe not radially reduced.

Similarly to the different refrigerant pipe 23, the connecting tube 22 is made of copper. The connecting tube 22 is a straight tube having constant outer and inner diameters. The connecting tube 22 is shorter in length in the pipe axis direction than the pipe body 21. Specifically, the connecting tube 22 is shorter in length in the pipe axis direction than the minor diameter portion 21c of the pipe body 21. The inner diameter of the connecting tube 22 is slightly larger than the outer diameter of the minor diameter portion 21c.

The minor diameter portion 21c of the pipe body 21 is inserted into the connecting tube 22 in the pipe diameter direction. The connecting tube 22 has an inner circumferential surface disposed to face an outer circumferential surface of the minor diameter portion 21c in the pipe diameter direction. The inner circumferential surface of the connecting tube 22 and the outer circumferential surface of the minor diameter portion 21c are brazed with use of a first brazing filler material B1. FIG. 2, as well as FIG. 3 and FIG. 5 to be referred to hereinafter exaggeratedly depict thickness in the pipe diameter direction of the first brazing filler material B1 in order for clearer depiction of a brazed portion. The same applies to a second brazing filler material B2 to be described later.

Figure 3:
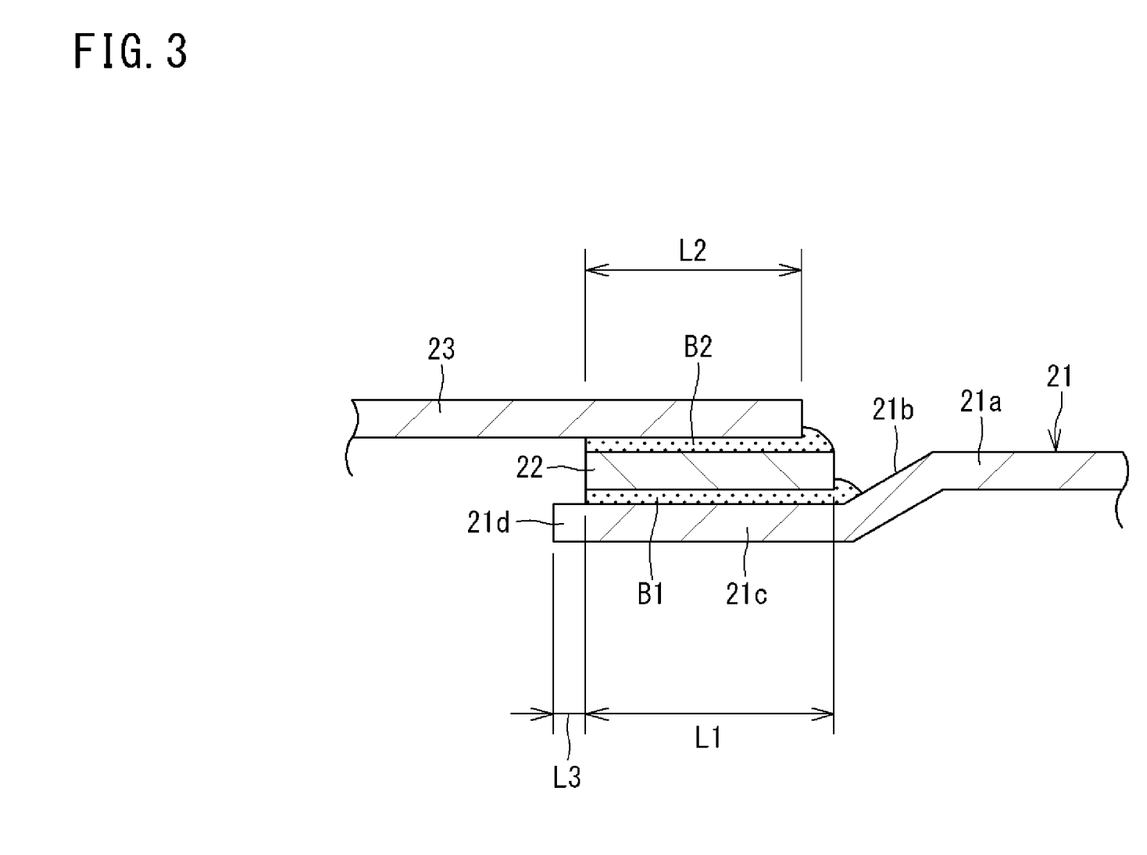
FIG. 3 is an enlarged sectional view of a portion A indicated in FIG. 2.

FIG. 3 is an enlarged sectional view of a portion A indicated in FIG. 2.

The inner circumferential surface of the connecting tube 22 and the outer circumferential surface of the minor diameter portion 21c are connected by "furnace brazing". Such connection is adopted for the following reason.

Stainless steel as the material for the pipe body 21 has a surface provided with a passive film (oxide film), so that there needs flux for removal of the oxide film before execution of brazing by hand (hereinafter, also called "handwork brazing") such as torch brazing. The refrigerant flows in the refrigerant circuit 4 configured as a closed circuit. If any flux remains in the refrigerant pipe 10A, the flux may be mixed with the refrigerant to adversely affect the refrigerant itself or performance of the element components (e.g. the compressor 12) that receives the refrigerant. The flux thus inevitably needs to be removed after brazing.

Stainless steel as the material for the pipe body 21 has embrittlement called sensitization when heated. Sensitization is a phenomenon that carbon contained in stainless steel is bound with chromium that is deposited in a grain boundary to generate a portion containing a small amount of chromium and having deteriorated corrosion resistance and the like. Sensitization is likely to occur within a known temperature range after being heated for a known period.

Furnace brazing is a technique of brazing in a continuous furnace or the like in a predetermined gas atmosphere such as a hydrogen gas atmosphere enabling removal of an oxide film. Furnace brazing thus achieves brazing of stainless steel without use of any flux. There accordingly needs no flux removal after brazing. Furnace brazing facilitates management of brazing temperature and a brazing period, to achieve brazing with temperature and a period that can inhibit sensitization. Furthermore, sensitization of the pipe body 21 can be inhibited also by adopting SUS304L smaller in carbon content than SUS304 as the material for the pipe body 21.

As depicted in FIG. 3, the pipe body 21 protrudes in the pipe axis direction from each end of the connecting tube 22. The minor diameter portion 21c of the pipe body 21 has an end disposed far from the stepped portion 21b and provided with a protrusion 21d protruding from the connecting tube 22. The connecting tube 22 has a length L1 in the pipe axis direction entirely overlapped with the pipe body 21 in the pipe diameter direction.

As described earlier, when the connecting tube 22 is connected to the pipe body 21 by furnace brazing, the connecting tube 22 is disposed in a high-temperature environment in the furnace. The connecting tube 22 may thus have coarsened copper crystal grains to cause strength deterioration. Assuming that the connecting tube 22 protrudes from an end of the pipe body 21, the connecting tube 22 may be highly possibly deformed when the connecting tube 22 deteriorated in strength hits a peripheral object during transportation of the refrigerant pipe, during assembly of the air conditioner, or the like. The connecting tube 22 according to the present embodiments is disposed to have the entirety in the pipe axis direction overlapped with the pipe body 21 in the pipe diameter direction, so that the connecting tube 22 deteriorated in strength is not provided by itself. Strength deterioration of the connecting tube 22 can thus be compensated with the pipe body 21.

The minor diameter portion 21c of the pipe body 21 has the protrusion 21d protruding from the connecting tube 22. If the protrusion 21d is not provided and an end surface in the pipe axis direction of the pipe body 21 (minor diameter portion 21c) and an end surface in the pipe axis direction of the connecting tube 22 are matched to be connected each other, any manufacturing error may cause the connecting tube 22 to protrude from the end surface of the pipe body 21 and be deformed as described above. The present embodiments provide the protrusion 21d at the end of the pipe body 21 to allow the connecting tube 22 possibly deteriorated in strength to be reliably overlapped with the pipe body 21 in the pipe diameter direction.

As depicted in FIG. 3, the different refrigerant pipe 23 is overlapped in the pipe diameter direction with the connecting tube 22 in a range L2 in the pipe axis direction, and is also overlapped with the pipe body 21. Strength deterioration of the connecting tube 22 is accordingly compensated also with the different refrigerant pipe 23 in the range L2.

The protrusion 21d of the pipe body 21 has a protrusion length L3 shorter than the length L1 in the pipe axis direction of the connecting tube 22. The protrusion length L3 may be exemplarily 1 mm or more and 3 mm or less.

The connecting tube 22 and the different refrigerant pipe 23 are brazed with use of the second brazing filler material B2. Examples of this brazing include torch brazing (burner brazing) that is executed by hand. The connecting tube 22 of the pipe body 21 and the different refrigerant pipe 23 are both made of copper and can thus be connected easily by brazing with use of a less expensive brazing filler material such as a phosphor copper brazer.

The second brazing filler material B2 is lower in melting point than the first brazing filler material B1. Examples of the first brazing filler material B1 include a brazing filler material having a melting point of 1000° C. or more, such as a phosphor bronze brazer, and examples of the second brazing filler material B2 include a brazing filler material having a melting point from 700° C. to 850° C., such as a phosphor copper brazer. The first brazing filler material B1 can thus be inhibited from melting when the different refrigerant pipe 23 is brazed to the connecting tube 22 with use of the second brazing filler material B2. When the different refrigerant pipe 23 is detached from the refrigerant pipe 10A for replacement of any element component or the like, a portion connecting the connecting tube 22 and the different refrigerant pipe 23 is heated at temperature higher than the melting point of the second brazing filler material B2 and lower than the melting point of the first brazing filler material B1. Such heating melts only the second brazing filler material B2 without melting the first brazing filler material B1 to detach the different refrigerant pipe 23 from the connecting tube 22. The connecting tube 22 is kept connected to the pipe body 21 of the refrigerant pipe 10A, so that a new different refrigerant pipe 23 can be connected to the connecting tube 22.

As depicted in FIG. 2, the outer diameter D1 of the major diameter portion 21a of the pipe body 21 is substantially equal to an outer diameter D2 of the connecting tube 22. The different refrigerant pipe 23 constant in inner diameter can thus be connected to each of the refrigerant pipe 10A according to the present embodiments and to an ordinary refrigerant pipe not including the connecting tube 22 (the refrigerant pipe including only the major diameter portion 21a without including the minor diameter portion 21c or the stepped portion 21b). It is thus possible to adopt a common jig or the like configured to increase or decrease the inner diameter of the different refrigerant pipe 23. When the major diameter portion 21a and the different refrigerant pipe 23 are made equal in inner diameter, the refrigerant flowing in the refrigerant pipe 10A can have less pressure fluctuation.

Figure 4A:
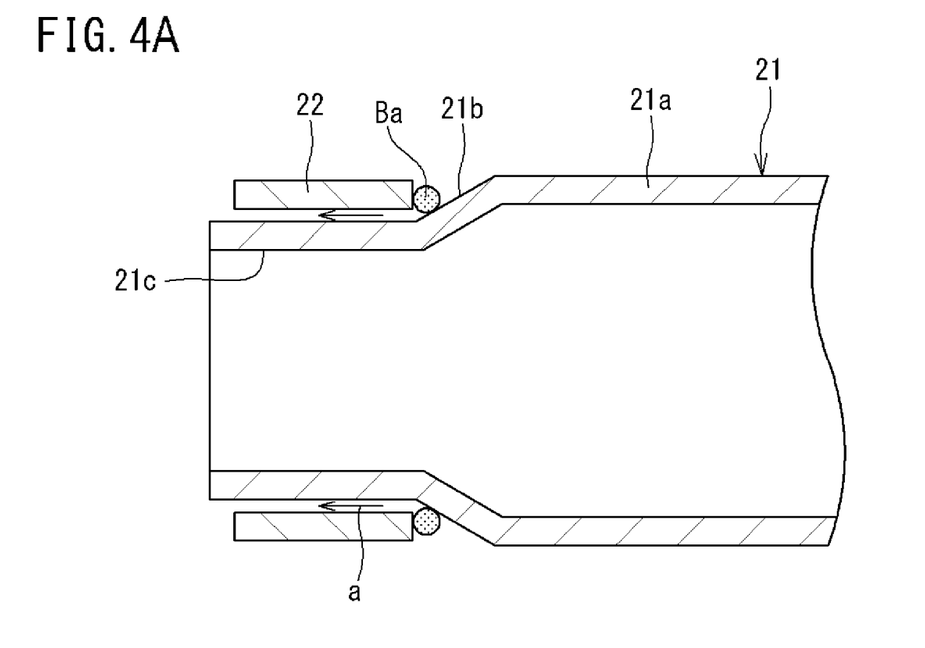
FIGS. 4A and 4B are sectional views depicting states before a pipe body of the refrigerant pipe and a connecting tube are brazed.
Figure 4B:
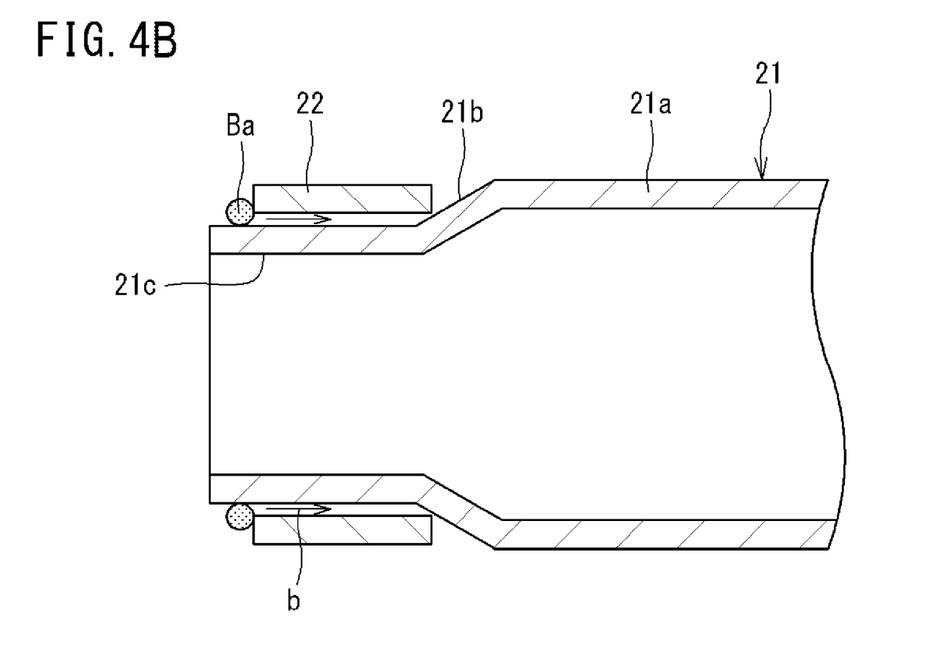

FIGS. 4A and 4B are sectional views depicting states before the pipe body 21 of the refrigerant pipe 10A and the connecting tube 22 are brazed.

As depicted in FIG. 4A, in order to braze the pipe body 21 and the connecting tube 22, a ring brazer Ba serving as the first brazing filler material B1 is initially fitted to an outer side in the pipe diameter direction of the minor diameter portion 21c of the pipe body 21. Subsequently, the connecting tube 22 is fitted to the outer side in the pipe diameter direction of the minor diameter portion 21c, and the ring brazer Ba is interposed between the connecting tube 22 and the stepped portion 21b. The pipe body 21 and the connecting tube 22 are placed in a high-temperature furnace in this state to melt the ring brazer Ba, and the first brazing filler material B1 is poured into a gap between the outer circumferential surface of the minor diameter portion 21c and the inner circumferential surface of the connecting tube 22 as indicated by an arrow a.

The ring brazer Ba is interposed between the connecting tube 22 and the stepped portion 21b in this manner to achieve brazing in a state where the connecting tube 22, the pipe body 21, and the ring brazer Ba are positioned relatively to one another. The stepped portion 21b can thus position in the pipe axis direction of the connecting tube 22 relatively to the pipe body 21. In view thereof, the stepped portion 21b constitutes a positioner in the pipe axis direction for the connecting tube 22 relative to the pipe body 21.

FIG. 4B exemplarily depicts the ring brazer B a fitted to an outer side in the pipe diameter direction of the protrusion 21d of the pipe body 21. The pipe body 21 and the connecting tube 22 are placed in the high-temperature furnace in this state to melt the ring brazer, and the first brazing filler material B1 is poured into the gap between the outer circumferential surface of the minor diameter portion 21c and the inner circumferential surface of the connecting tube 22 as indicated by an arrow b. Also in this case, the stepped portion 21b positions in the pipe axis direction of the connecting tube 22 relatively to the pipe body 21.

The refrigerant pipe 10A is mostly constituted by the pipe body 21 that is made of stainless steel and is less expensive and stronger than copper as the material for the connecting tube 22. The refrigerant pipe 10A can accordingly be manufactured less expensively and more strongly than a refrigerant pipe entirely made of copper.

Second Embodiments

Figure 5:
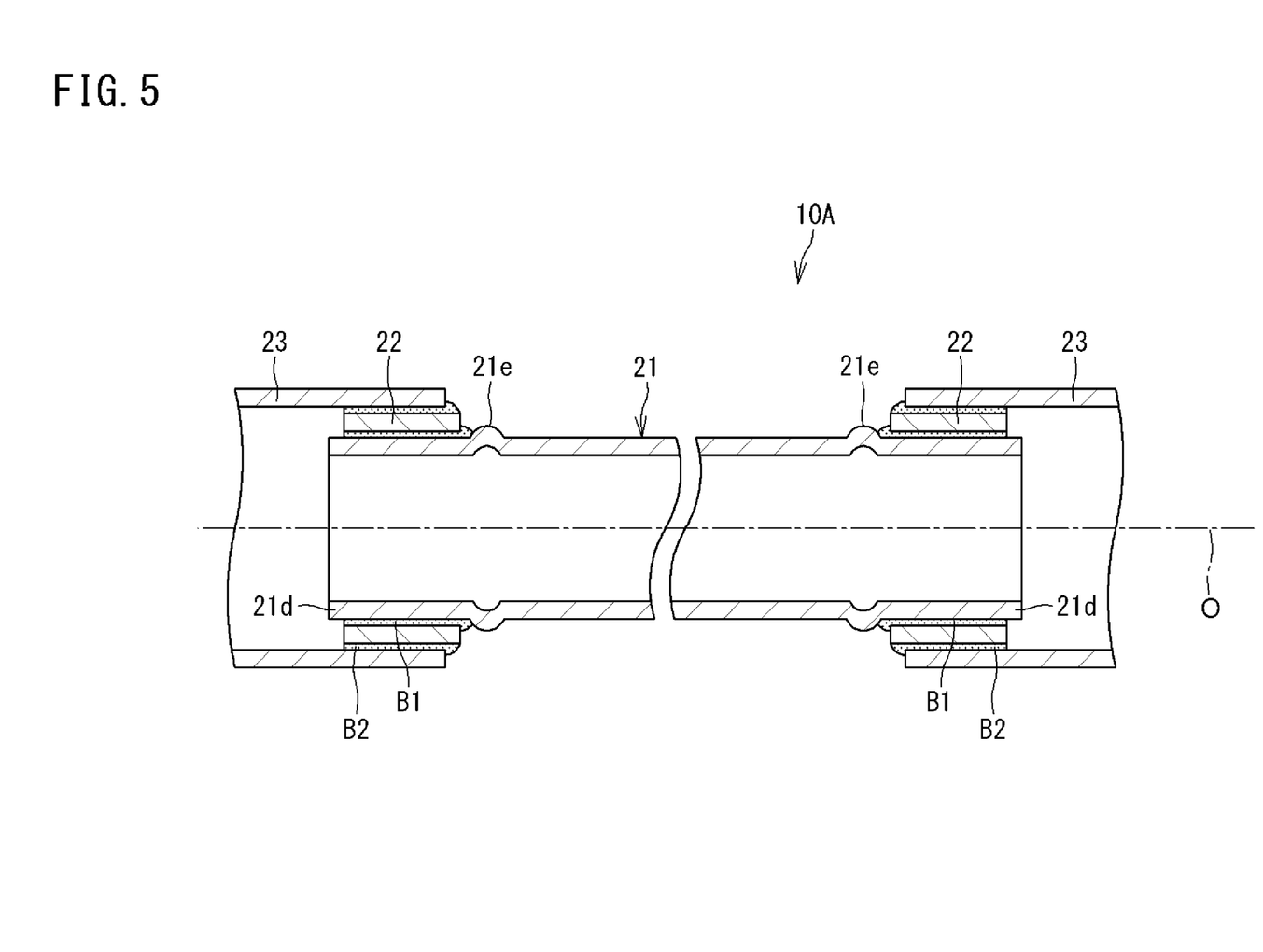
FIG. 5 is a sectional view of a refrigerant pipe according to second embodiments.

FIG. 5 is a sectional view of a refrigerant pipe according to the second embodiments.

A refrigerant pipe 10A according to the present embodiments is different from that according to the first embodiments in a structure of a pipe body 21. The pipe body 21 has a constant inner diameter and a constant outer diameter D, and does not include any major diameter portion, any minor diameter portion, or any stepped portion as in the first embodiments.

The pipe body 21 according to the present embodiments has an outer circumferential surface provided with protrusions 21e protruding outward in the pipe diameter direction and disposed at a plurality of (e.g. two) circumferential positions. The protrusions 21e each have a tip end protruding outward in the pipe diameter direction from the inner circumferential surface of the connecting tube 22. The protrusions 21e function as positioners in the pipe axis direction for the connecting tube 22 relative to the pipe body 21. Provision of the protrusions 21e thus configured allows the pipe body 21 to reliably protrude from an end in the pipe axis direction of the connecting tube 22. The protrusions 21e may alternatively be provided entirely on an outer circumference of the pipe body 21.

Other Embodiments

According to each of the embodiments described above, the connecting tube 22 of the refrigerant pipe 10A and the different refrigerant pipe 23 are made of copper. However, the connecting tube 22 of the refrigerant pipe 10A and the different refrigerant pipe 23 are not limitedly made of copper but can alternatively be made of a copper alloy. A copper alloy is obtained by adding different metal or nonmetal to copper as the main ingredient to improve properties of copper. Like copper, a copper alloy does not need flux treatment or the like and facilitates brazing. An exemplary copper alloy contains at least 98 weight percent of copper. Another exemplary copper alloy contains at least 99 weight percent of copper.

The connecting tube 22 of the refrigerant pipe 10A and the different refrigerant pipe 23 may be made of a material having the same main ingredient. Accordingly, each of the connecting tube 22 and the different refrigerant pipe 23 may be made of copper or a copper alloy, or either one may be made of copper and the other may be made of a copper alloy. In the case where the connecting tube 22 and the different refrigerant pipe 23 are each made of a copper alloy, ingredients other than the main ingredient may be different from each other. That is, the connecting tube 22 may be made of a material different from that of the different refrigerant pipe 23 with their main ingredients being the same material. Also in this case, the connecting tube 22 and the different refrigerant pipe 23 can be brazed without use of any flux.

Both copper and a copper alloy are often adopted to the different refrigerant pipe 23 constituting part of the element components, so that adopting either one as the material for the connecting tube 22 enables manufacture of the refrigerant pipe 10A for multiple purposes.

Action and Effects of Embodiments

When the stainless steel tube and the copper tube are joined by furnace brazing in accordance with the technique described in Patent Literature 1, the copper tube may have strength deterioration in a high-temperature environment in a furnace. Therefore, one or more embodiments of the present disclosure provide a refrigerant pipe including a pipe body made of stainless steel and a connecting tube made of copper or a copper alloy, the refrigerant pipe achieving compensation for strength deterioration of the connecting tube at high temperature.

Action and Effects (1) The refrigerant pipe 10A according to any one of the above embodiments includes the pipe body 21 made of stainless steel and the connecting tube 22 made of copper or a copper alloy for connection with the different refrigerant pipe 23. The connecting tube 22 is connected to the outer circumferential surface at the end in the pipe axis direction of the pipe body 21. The connecting tube 22 has the entirety in the pipe axis direction overlapped with the pipe body 21 in the pipe diameter direction. Even in an exemplary case where the pipe body 21 and the connecting tube 22 are furnace brazed and the connecting tube 22 at high temperature thus has strength deterioration, the pipe body 21 supports the connecting tube 22 to compensate for strength deterioration of the connecting tube 22.

(2) In the refrigerant pipe 10A according to any one of the above embodiments, the pipe body 21 protrudes from both ends in the pipe axis direction of the connecting tube 22. The entirety in the pipe axis direction of the connecting tube 22 can thus be reliably overlapped with the pipe body 21 in the pipe diameter direction.

(3) The pipe body 21 according to any one of the above embodiments includes the positioner (the stepped portion 21b or the protrusions 21e) in the pipe axis direction for the connecting tube 22. The connecting tube 22 can thus be positioned appropriately and easily on the pipe body 21.

(4) The pipe body 21 according to any one of the above embodiments includes the minor diameter portion 21c, the stepped portion 21b provided continuously to the minor diameter portion 21c and enlarged in outer diameter outward in the pipe diameter direction from the minor diameter portion 21c, and the major diameter portion 21a provided continuously to the stepped portion 21b and larger in outer diameter than the minor diameter portion 21c, and the stepped portion 21b constitutes the positioner. The positioner can thus be provided by change in diameter of the pipe body 21.

(5) The outer diameter D2 of the connecting tube 22 is equal to the outer diameter D1 of the major diameter portion 21a in any one of the above embodiments. When the different refrigerant pipe 23 is connected to each of the refrigerant pipe 10A including the connecting tube 22 and an ordinary refrigerant pipe not including the connecting tube, the minor diameter portion, or the stepped portion (the refrigerant pipe including only the major diameter portion), the different refrigerant pipe 23 can be made constant in inner diameter. It is thus possible to adopt a common jig or the like configured to increase or decrease the inner diameter of the different refrigerant pipe 23.

(6) The connecting tube 22 according to any one of the above embodiments is brazed to the end of the pipe body 21 with use of the first brazing filler material B1. The first brazing filler material B1 is higher in melting point than the second brazing filler material B2 used to braze the different refrigerant pipe 23 to the connecting tube 22. The first brazing filler material B1 can thus be inhibited from melting due to heat upon brazing the different refrigerant pipe 23 to the connecting tube 22.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST 1 refrigeration apparatus
4 refrigerant circuit
10A refrigerant pipe
21 pipe body
21a major diameter portion
21b stepped portion (positioner)
21c minor diameter portion
21e protrusion (positioner)
22 connecting tube
23 different refrigerant pipe
B1 brazing filler material
B2 brazing filler material
D1 outer diameter
D2 outer diameter

What is claimed is:

1. A refrigerant pipe constituting a refrigerant circuit of a refrigeration apparatus, the refrigerant pipe comprising:
a pipe body made of stainless steel; and
a first connecting tube:
    made of copper or a copper alloy,
    that is a straight tube having constant outer and inner diameters and smooth outer and inner surfaces, and
    that is configured to connect a first different refrigerant pipe to the refrigerant pipe, wherein
the first connecting tube is connected to an outer circumferential surface of a first end of the pipe body in a pipe axis direction of the pipe body,
the first connecting tube overlaps with the pipe body in a pipe diameter direction in an entirety of the first connecting tube in the pipe axis direction, and
the pipe body protrudes from both ends of the first connecting tube in the pipe axis direction.

2. The refrigerant pipe according to claim 1, wherein the pipe body comprises a positioner configured to position the first connecting tube in the pipe axis direction.

3. The refrigerant pipe according to claim 2, wherein the pipe body comprises:
a minor diameter portion constituting the first end;
a stepped portion disposed continuously to the minor diameter portion and that has an outer diameter enlarged from an outer diameter of the minor diameter portion; and
a major diameter portion disposed continuously to the stepped portion and that has an outer diameter that is larger than the outer diameter of the minor diameter portion, and
the stepped portion constitutes the positioner.

4. The refrigerant pipe according to claim 3, wherein the first connecting tube has an outer diameter equal to the outer diameter of the major diameter portion.

5. A refrigerant pipe constituting a refrigerant circuit of a refrigeration apparatus, the refrigerant pipe comprising:
a pipe body made of stainless steel; and
a first connecting tube made of copper or a copper alloy and that is configured to connect a first different refrigerant pipe to the refrigerant pipe, wherein
the first connecting tube is connected to an outer circumferential surface of a first end of the pipe body in a pipe axis direction of the pipe body,
the first connecting tube overlaps with the pipe body in a pipe diameter direction in an entirety of the first connecting tube in the pipe axis direction,
the first connecting tube is brazed to the first end of the pipe body with a first brazing filler material, and
the first brazing filler material has a melting point that is higher than a melting point of a second brazing filler material that brazes the first different refrigerant pipe to the first connecting tube.

6. A refrigerant pipe constituting a refrigerant circuit of a refrigeration apparatus, the refrigerant pipe comprising:
a pipe body made of stainless steel;
a first connecting tube made of copper or a copper alloy and that is configured to connect a first different refrigerant pipe to the refrigerant pipe; and
a second connecting tube made of copper or a copper alloy and that is configured to connect a second different refrigerant pipe to the refrigerant pipe, wherein
the first connecting tube is connected to an outer circumferential surface of a first end of the pipe body in a pipe axis direction of the pipe body,
the first connecting tube overlaps with the pipe body in a pipe diameter direction in an entirety of the first connecting tube in the pipe axis direction,
the second connecting tube is connected to an outer circumferential surface of a second end of the pipe body in the pipe axis direction of the pipe body,
the second connecting tube overlaps with the pipe body in the pipe diameter direction in an entirety of the second connecting tube in the pipe axis direction,
the first connecting tube is disposed at the first end of the pipe body, and
the second connecting tube is disposed at the second end of the pipe body.

* * * * *